Aug. 5, 1947.  T. S. WATSON  2,425,166

METHOD OF FORMING RUBBER BAGS

Filed Jan. 25, 1946

INVENTOR
Thomas S. Watson
BY
Jearles & French
ATTORNEYS

Patented Aug. 5, 1947

2,425,166

UNITED STATES PATENT OFFICE 2,425,166

METHOD OF FORMING RUBBER BAGS

Thomas S. Watson, Milwaukee, Wis., assignor to Huebsch Manufacturing Company, Milwaukee, Wis., a corporation of Wisconsin Application January 25, 1946, Serial No. 643,306

3 Claims. (Cl. 18—56)

The invention relates to a method of forming large rubber bags, particularly such bags that are adapted for use in so-called compression extractors, in which the upper end of the bag is secured to a fixed casing and receives the material to be treated within it and the bag is moved to compress the material between it and the cover of the extractor by fluid pressure acting on the exterior of the bag.

Prior to this invention considerable difficulty has been experienced in making a satisfactory bag, and the object of this invention is to provide a method of making these rubber bags with relatively inexpensive equipment wherein the bag is formed of a tube section and a head section and an upper edge portion for attaching the bag to its container.

The invention further consists in the several steps of the method hereinafter described and more particularly defined by the appended claims.

Figure 1:
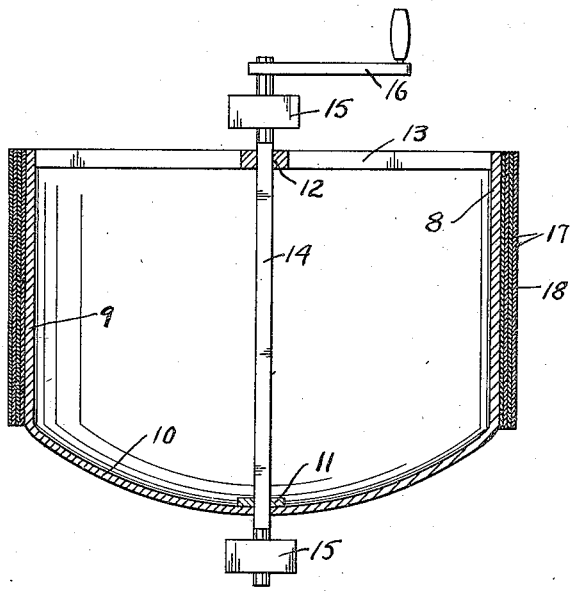
Fig. 1 is a vertical sectional view showing the first step of forming the tube section.

Referring to Fig. 1, the numeral 8 designates a form member of the shape of the bag to be formed having tubular siding 9 and a convex head end 10 and provided with a shaft opening 11 in its head and a similar opening 12 in a spider 13 secured to said form. A shaft 14 extends through the openings 11 and 12 and has a removable threaded connection with one of these openings and is mounted on exterior bearings 15 and provided with a hand crank 16 whereby rotation of the shaft will rotate the form. Raw sheet rubber 17 is built up into a laminated cylinder or tube 18 by winding it about the form member 8 as the same is rotated by the turning of said shaft 14 though a single sheet of heavy rubber stock may be used, if desired, and be wound about the form and its ends suitably spliced together.

After the tube or siding section of the bag is thus formed, the form member 8 is removed from the shaft 14, the head end of the rubber tubing is bevelled off, and a head member 19 of heavy rubber stock is applied over the head of the form and its periphery dressed to form a spliced connection 20 with the bevelled edge 21 of the siding 18, thus forming the body of the bag whose outer surface is then covered with canvas 22 to protect it during vulcanizing.

Figure 3:
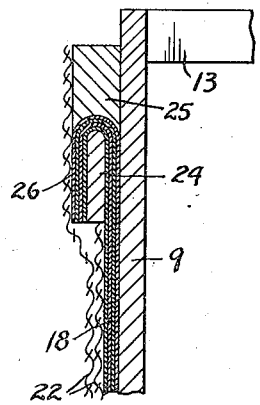
Fig. 3 is a detailed vertical sectional view showing the manner of forming a molded channel edge portion for the bag.
Figure 2:
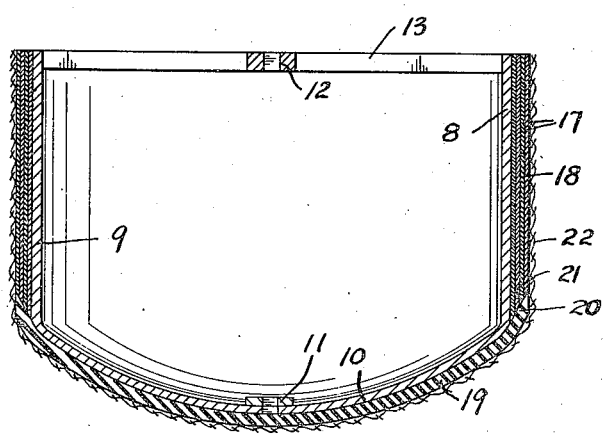
Fig. 2 is a vertical sectional view showing the head section secured to the tube section.
Figure 4:
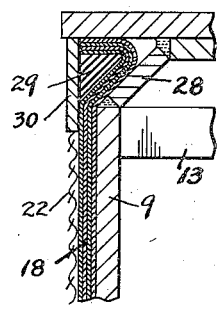
Fig. 4 is a view similar to Fig. 3 showing beaded form of edge portion for the bag.
Figures 5, 6:
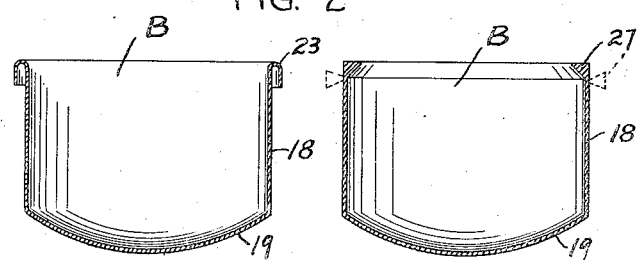
Fig. 5 is a vertical sectional view of a completed bag with the channelled edge.
Fig. 6 is a vertical sectional view of a completed bag with a beaded edge.

Thereafter, where the bag B is to have a channelled top edge 23, as shown in Fig. 5, the upper portion of the tubular siding 18 is bent over, as shown in Fig. 3, between an inner curved edge form ring 24 and an outer concaved form ring 25 to form this edge portion, the canvas 22 being brought up along the side 26 of the folded over edge, and while in this condition and on the form, the bag is placed in a vulcanizer, and the rubber cured to form the complete bag, shown in Fig. 5, when the mold members are removed therefrom.

Where the bag is to have a beaded top edge 27, as shown in Fig. 6, the upper edge of the siding 18 is extended beyond the tubular sides 9 of the form and bent back upon a conical ring 28 secured to said siding 9 and is bent into a channel shape, as shown in Fig. 4, and filler rubber 29 inserted into this channel and a ring 30 positioned to retain the beaded edge thus formed in position while the bag is cured in the vulcanizer, and thereafter when the form parts are removed, the bag appears as shown in full in Fig. 6, but in use the beaded edge 27 is turned outwardly as indicated by the dotted lines in said figure and clamped in position by parts of the casing of the extractor.

By following the method above described, bags of three feet or more in diameter may be expeditiously produced and without an initial outlay for expensive molds.

I desire it to be understood that this invention is not to be limited to specific details of the method except in so far as such are included in the claims.

What I claim as my invention is:

1. The method of making rubber bags which comprises taking a form having tubular siding and a convexly curved head, applying a raw rubber sheet to the siding of the form to form a cylindrical tube while rotating said form, bevelling the head end of said tube to form an edge substantially coextensive with the curved surface of said head, applying a raw rubber head to the head of the form and joining its periphery with the adjacent bevelled edge of said tube, forming the other edge of said rubber siding into an anchoring portion, covering the bag thus formed with a protective material, and vulcanizing the bag while on the form.

2. The method of making rubber bags which comprises taking a form having tubular siding and a head and a removable centrally disposed shaft, winding a sheet of raw rubber about said siding to form a cylindrical rubber siding while rotating said shaft, removing said shaft from the form, applying a head member of raw rubber to the head of the form and joining its periphery with the adjacent edge of said tube, forming the other edge portion of said rubber siding into an anchoring portion, covering the bag thus formed with a protective material, and vulcanizing the bag while on the form.

3. The method of making rubber bags which comprises taking a form having tubular siding and a convexly curved head, applying a raw rubber sheet to the siding of the form to form a cylindrical tube while rotating said form, bevelling the head end of said tube to form an edge substantially coextensive with the curved surface of said head, applying a raw rubber head to the head of the form and joining its periphery with the adjacent bevelled edge of said tube, bending over the other edge portion of said rubber siding to form a channelled edge clamped between a pair of forming rings, covering the bag thus formed with a protective material and vulcanizing the bag while on the form.

THOMAS S. WATSON.

REFERENCES CITED

The following references are of record in the file of this patent:

UNITED STATES PATENTS

| Number | Name | Date |
| --- | --- | --- |
| 2,199,790 | Guinzberg | May 7, 1940 |
| 2,101,252 | Guinzberg | Dec. 7, 1937 |
| 1,352,418 | Boyer | Sept. 7, 1920 |
| 1,727,483 | Moszelt | Sept. 10, 1929 |
| 341,552 | Carter | May 11, 1886 |
| 1,747,964 | Wirth | Feb. 18, 1930 |